US012752600B2

(12) United States Patent
Lee et al.

(10) Patent No.: US 12,752,600 B2
(45) Date of Patent: Oct. 6, 2026

(54) COMPLEX MOTOR AND HEATER DRIVING CIRCUIT, AND CONTROL SYSTEM THEREFOR

(71) Applicant: Hanon Systems, Daejeon (KR)

(72) Inventors: Songcheol Lee, Daejeon (KR); Min Sik Kim, Daejeon (KR); Sang Hun Kim, Daejeon (KR); Tae Wan Kim, Daejeon (KR); Pureunsam Park, Daejeon (KR); Kyung Won An, Daejeon (KR)

(73) Assignee: HANON SYSTEMS, Daejeon (KR)

(*) Notice: Subject to any disclaimer, the term of this patent is extended or adjusted under 35 U.S.C. 154(b) by 741 days.

(21) Appl. No.: 18/026,624

(22) PCT Filed: Sep. 17, 2021

(86) PCT No.: PCT/KR2021/012791
§ 371 (c)(1),
(2) Date: Mar. 16, 2023

(87) PCT Pub. No.: WO2022/092572
PCT Pub. Date: May 5, 2022

(65) Prior Publication Data

US 2023/0339291 A1 Oct. 26, 2023

(30) Foreign Application Priority Data

Oct. 27, 2020 (KR) ........................ 10-2020-0140011

(51) Int. Cl.
*B60H 1/22* (2006.01)
*H02P 27/08* (2006.01)

(52) U.S. Cl.
CPC ........... *B60H 1/2218* (2013.01); *H02P 27/08* (2013.01); *H02P 2205/03* (2013.01)

(58) Field of Classification Search
CPC .............................. B60H 1/2218; H02P 27/08
See application file for complete search history.

(56) References Cited

U.S. PATENT DOCUMENTS

2006/0103358 A1 5/2006 Schulte et al.

FOREIGN PATENT DOCUMENTS

JP H07304325 A 11/1995
JP 2009220753 A 10/2009
(Continued)

OTHER PUBLICATIONS

International Search Report issued in PCT/KR2021/012791 on Jan. 6, 2022.

*Primary Examiner* — Ibrahime A Abraham
*Assistant Examiner* — John S Hunter, Jr.
(74) *Attorney, Agent, or Firm* — NORTON ROSE FULBRIGHT US LLP

(57) ABSTRACT

A drive circuit and control system are provided for operating a three-phase motor and a heater separately or concurrently using shared switching resources. The circuit includes a first switching unit coupled to a power supply and to respective first terminals of the motor and a heating unit, a second switching unit coupled to second terminals of the motor, and a third switching unit coupled to second terminals of the heating unit. A control unit drives the motor by turning on switches of the first and second switching units and applying space-vector PWM. For heater operation, the control unit sets a power control output value and modulates the third switching unit, and turns on the first switching unit when PWM duty matches the output value. During concurrent operation, PWM duties of the first switching unit are compared and a corresponding switch of the third switching unit is turned on.

8 Claims, 4 Drawing Sheets

(56) References Cited

FOREIGN PATENT DOCUMENTS

| | | | |
|---|---|---|---|
| JP | 2011172461 | A | 9/2011 |
| KR | 20010059060 | A | 7/2001 |
| KR | 20180007567 | A | 1/2018 |
| KR | 20180128716 | A | 12/2018 |

COMPLEX MOTOR AND HEATER DRIVING CIRCUIT, AND CONTROL SYSTEM THEREFOR

CROSS REFERENCE TO RELATED APPLICATIONS

The present application is a national phase application under 35 U.S.C. § 371 of International Application No. PCT/KR2021/012791 filed Sep. 17, 2021, which claims priority from Korean patent application No. 10-2020-0140011 filed Oct. 27, 2020, the entire contents of each of which is incorporated herein by reference in its entirety.

TECHNICAL FIELD

The present invention relates to a control circuit, and more particularly, to a complex motor and heater driving circuit capable of separately or simultaneously controlling a three-phase motor and a heater and a control system therefor.

BACKGROUND ART

In general, products using a three-phase motor, such as vehicle engine cooling fans or electric compressors, use six switching elements. In addition, even in case of a vehicle heater, when three heating elements are used, three switching elements for control are required to drive the heater, and typically one to three switch elements for protection are also required.

Referring to Korean Patent Application Laid-Open No. 10-2018-0007567, a conventional three-phase motor circuit includes a switching unit at a high voltage side, a switching unit at a low voltage side and a three-phase motor. Referring to Korean Patent Application Laid-Open No. 10-2001-0059060, a conventional heater circuit includes a heater switch, a relay and a contact. In the related art, the three-phase motor and the heater are separately circuited, and also individually controlled.

In the related art, in case that one switch element for protection is used, the size of a controller may be configured to be small, but there is a problem in that the heating element is impossible to be individually protected, and in case that three switching elements for protection are used, protection of the heating element is possible to be individually protected, but there is a problem in that the size of the controller increases. In addition, in case that the motor and heater are driven with separate circuits, a minimum of 10 to a maximum of 12 switching elements are used, thereby resulting in a problem of high cost and increasing in the size of controller.

DOCUMENT OF RELATED ART

Patent Document 1 Related Document 1
Korean Patent Application Laid-Open No. 10-2018-0007567 (published on Jan. 23, 2018)
Patent Document 2 Related Document 2
Korean Patent Application Laid-Open No. 10-2001-0059060 (published on Jul. 6, 2001)

DISCLOSURE

Technical Problem

The present invention has been made to solve the above problems, and an object of the present invention is to provide a complex motor and heater driving circuit and a system therefor capable of controlling a heater using a switching element of a motor circuit.

Technical Solution

A complex motor and heater driving circuit according to the present invention may include: a first switching unit connected to one end of each of a motor and a heating unit and configured to transmit power to the motor and the heating unit; a second switching unit connected to the other end of the motor to determine driving; and a third switching unit connected to the other end of the heating unit to determine driving.

Furthermore, the motor may be configured as a three-phase motor, the first switching unit, the second switching unit and the third switching unit each may include three switches, and the heating unit may include three heating elements.

A control system for a complex motor and heater driving circuit according to the present invention may include: a complex motor and heater driving circuit including a first switching unit connected to one end of each of a motor and heating unit and configured to transmit power to the motor and the heating unit, a second switching unit connected to the other end of the motor to determine driving, and a third switching unit connected to the other end of the heating unit to determine driving; and a control unit connected to the complex motor and heater driving circuit and configured to control the complex motor and heater driving circuit. Furthermore, when receiving a motor operation command, the control unit may turn on all switches of the first switching unit and all switches of the second switching unit, and control the first switching unit and the second switching unit using a SVPWM method.

In addition, when receiving a heater operation command, the control unit may turn on all switches of the third switching unit after setting a power control output value, and turn on all switches of the first switching unit when a PWM duty of the third switching unit is equal to the power control output value.

In addition, when receiving the motor operation command and the heater operation command, the control unit may turn on all switches of the first switching unit and all switches of the second switching unit, and compare the PWM duty applied to each switch of the first switching unit, and turn on a switch of the third switching unit connected to a switch in which the largest PWM duty is applied.

In this case, when the power control output value exceeds a reference duty value, the control unit may perform a control by applying the reference duty value to the PWM duty of the third switching unit.

Preferably, the reference duty value may be 0.5.

Furthermore, the motor may be applied to any one of a cooling fan, a compressor, or a blower.

Advantageous Effects

In the complex motor and heater driving circuit and the control system therefor according to the present invention, since the first switching unit is commonly used for the operation of the motor and the heater, the number of switches required may be reduced compared to the case that the motor and heater are separately circuited, thereby reducing the size of the control unit that controls the motor and heater, decreasing the manufacturing cost and individually protecting the heating element.

MODE FOR INVENTION

Figure 1:
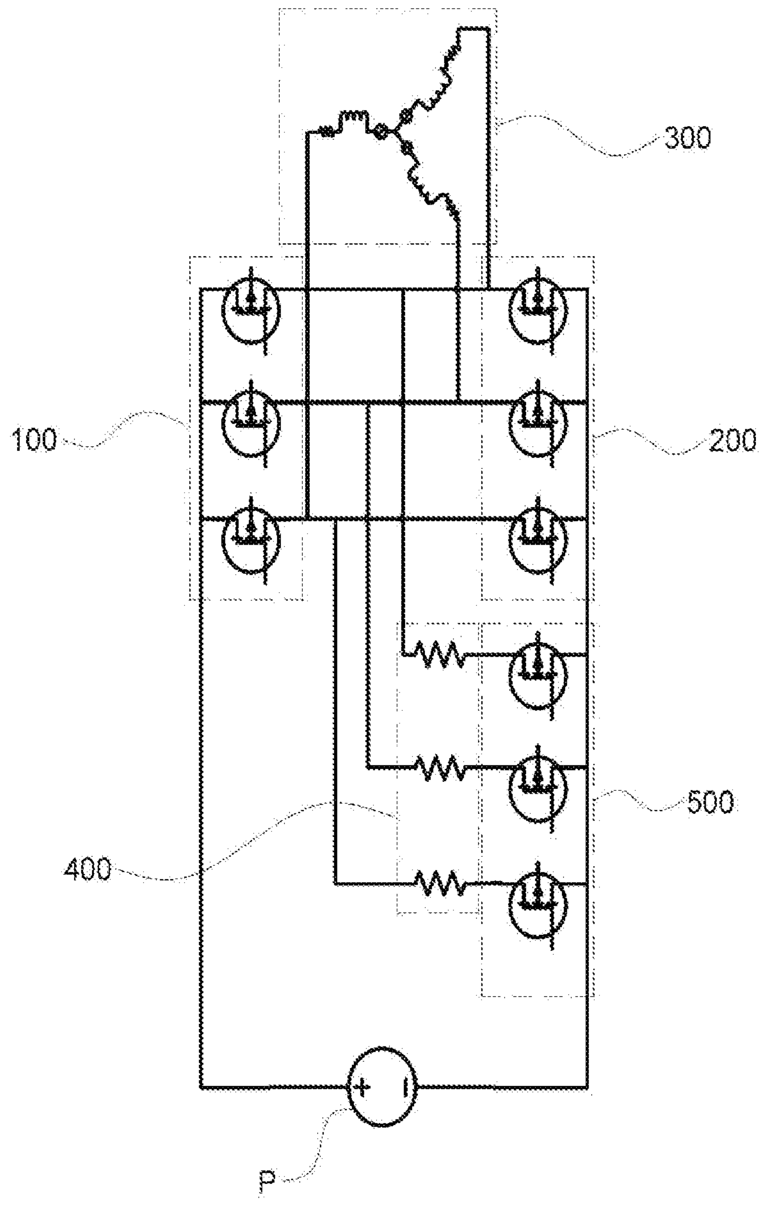
FIG. 1 is a view illustrating a complex motor and heater driving circuit according to the present invention.

Hereinafter, the technical spirit of the present invention will be described in more detail using the accompanying drawings. In addition, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Therefore, the exemplary embodiments disclosed in the present specification and the configurations illustrated in the drawings are just the best preferred exemplary embodiments of the present invention and do not represent all the technical spirit of the present invention. Accordingly, it should be appreciated that various modified examples capable of substituting the exemplary embodiments may be made at the time of filing the present application.

Hereinafter, the technical spirit of the present invention will be described in more detail using the accompanying drawings. The accompanying drawings are only exemplary embodiments illustrated to explain the technical spirit of the present invention in more detail, and the technical spirit of the present invention is not limited to the form of the accompanying drawings.

Referring to FIG. 1, a complex motor and heater driving circuit according to the present invention includes a first switching unit 100 connected to one end of each of a motor 300 and heating unit 400 and configured to transmit power to the motor 300 and the heating unit 400; a second switching unit 200 connected to the other end of the motor 300 to determine driving; and a third switching unit 500 connected to the other end of the heating unit 400 to determine driving.

The first switching unit 100 includes at least one switch (switch element) and is configured to be commonly used to control the motor and heater.

The second switching unit 200 includes at least one switch and is configured to be used to control the motor.

The motor 300 is configured to be connected between the first switching unit 100 and the second switching unit 200, and may be applied to any one of a cooling fan, a compressor or a blower.

The heating unit 400 is configured to be connected between the first switching unit 100 and the third switching unit 500, may be configured as a resistance type, and becomes a heat source of the heater.

The third switching unit 500 includes at least one switch and is configured to be used to protect and control the heater.

In the complex motor and heater driving circuit according to the present invention, since the first switching unit 100 is commonly used for the operation of the motor and the heater, the number of switches required may be reduced compared to the case that the motor and heater are separately circuited, thereby reducing a size of a control unit that controls the motor and heater, decreasing the manufacturing cost.

In this case, the motor 300 may be configured as a three-phase motor, the first switching unit 100, the second switching unit 200 and the third switching unit 500 each may include three switches, and the heating unit 400 may include three heating elements.

That is, as illustrated in FIG. 1, the motor 300 may be configured as a three-phase motor, the first switching unit 100 and the second switching unit 200 each may include three switches connected to the three-phase motor, and the heating unit 400 may include three heating elements each connected to each of the three switches of the first switching unit 100, and the third switching unit 500 may include three switches each connected to each of the three heating elements.

With this configuration, there is an effect in that the heating elements are individually protected.

In addition, a control system for the complex motor and heater driving circuit according to the present invention may include: the complex motor and heater driving circuit including the first switching unit 100 connected to one end of each of the motor 300 and heating unit 400 and configured to transmit power to the motor 300 and the heating unit 400, the second switching unit 200 connected to the other end of the motor 300 to determine driving, and the third switching unit 500 connected to the other end of the heating unit 400 to determine driving; and a control unit connected to the complex motor and heater driving circuit and configured to control the complex motor and heater driving circuit.

The first switching unit 100 includes at least one switch (switch element) and is configured to be commonly used to control the motor and heater.

The second switching unit 200 includes at least one switch and is configured to be used to control the motor.

The motor 300 is configured to be connected between the first switching unit 100 and the second switching unit 200, and may be applied to any one of a cooling fan, a compressor or a blower.

The heating unit 400 is configured to be connected between the first switching unit 100 and the third switching unit 500, may be configured as a resistance type, and becomes a heat source of the heater.

The third switching unit 500 includes at least one switch and is configured to be used to protect and control the heater.

The control unit may control operations of the motor 300 and the heating unit 400 by controlling ON/OFF of the first switching unit 100, the second switching unit 200, and the third switching unit 500.

In the control system for the complex motor and heater driving circuit according to the present invention, a motor control circuit and heater control circuit are configured as a complex single circuit, and thus the control unit may control the motor and circuit by connecting the motor control circuit and the heater control circuit to the complex circuit, thereby reducing the number of switches required for control to lower the manufacturing cost and reduce the size of the control unit.

Figure 2:
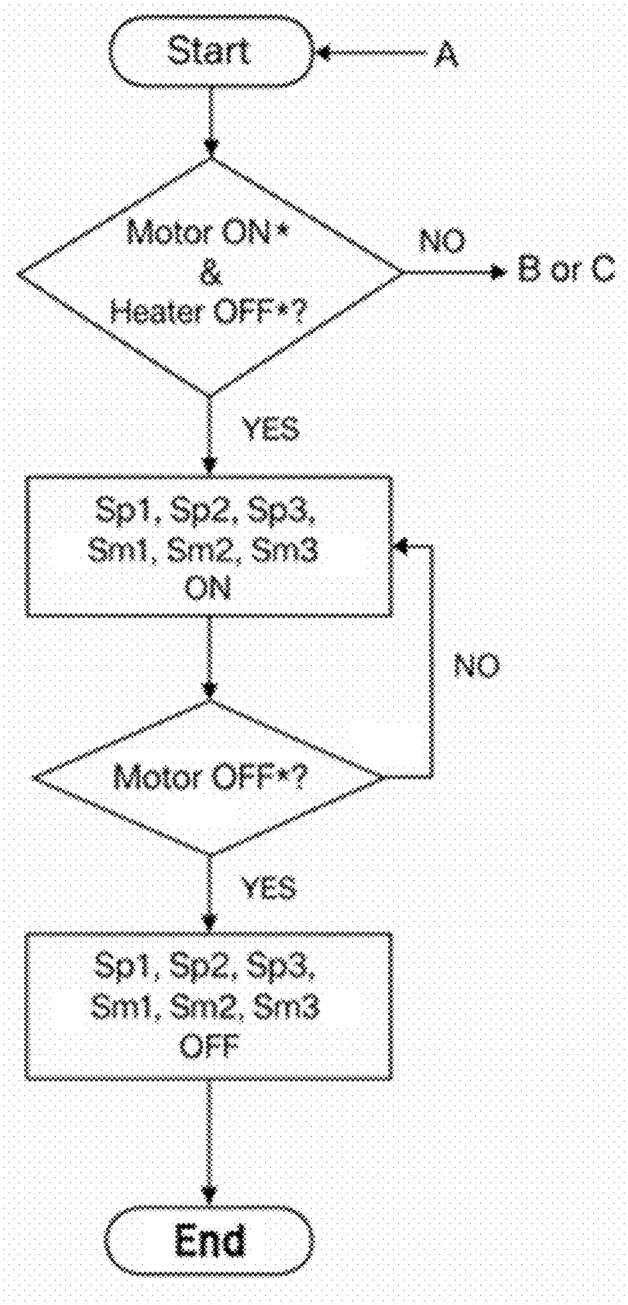
FIG. 2 is a flowchart illustrating a motor operation control according to the present invention.

Referring to FIG. 2, when receiving a motor operation command, the control unit may turn on all switches of the first switching unit and all switches of the second switching unit, and the first switching unit and the second switching unit may be controlled using a SVPWM method.

That is, when receiving the motor operation command and a heater stop command through an external device such as an external operating device, the control unit turns on a first common switch Sp1, a second common switch Sp2 and a third common switch Sp3 formed in the first switching unit and a first motor switch Sm1, a second motor switch Sm2 and a third motor switch formed in the second switching unit to connect the first switching unit, the motor and the second switching unit to each other. The control unit controls the switches of the first switching unit and the switches of the second switching unit using the SVPWM method until receiving the motor stop command, and turns off the switches of the first switching unit and the switches of the second switching unit to stop the operation of the motor when receiving the motor stop command.

Figure 3:
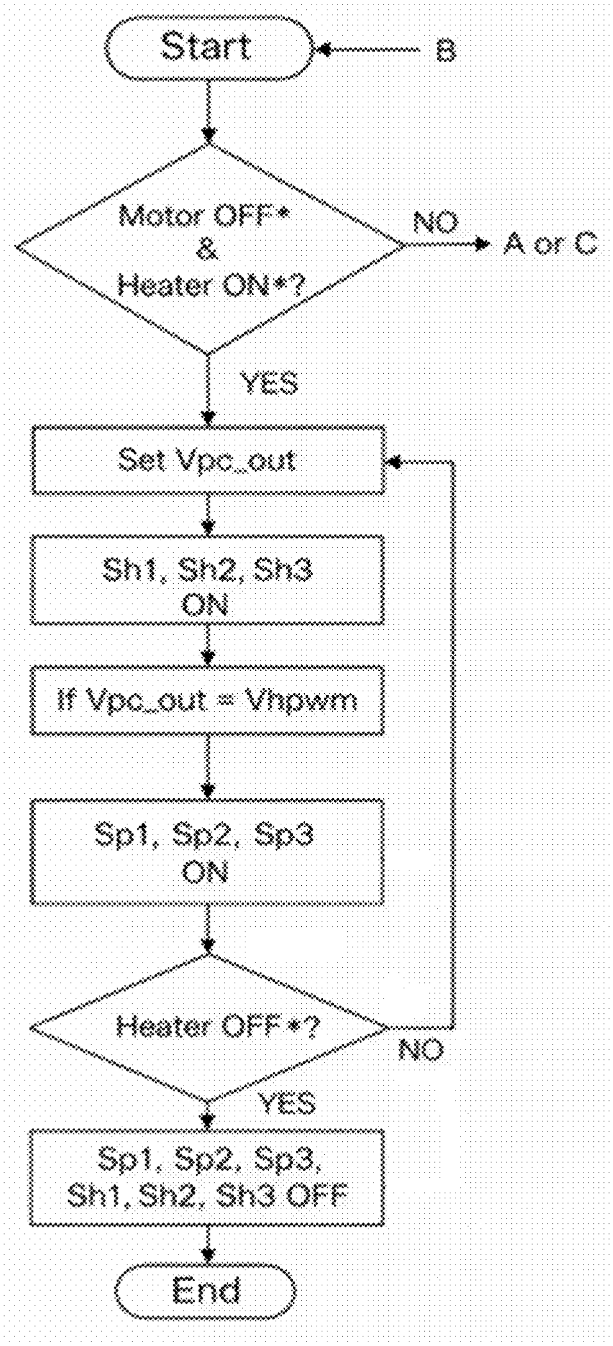
FIG. 3 is a flowchart illustrating a heater operation control according to the present invention.

Referring to FIG. 3, when receiving a heater operation command, the control unit may set a power control output value Vpc_out, then turn on all switches of the third switching unit, and when a PWM duty Vhpwm of the third switching unit is equal to the power control output value Vpc_out, the control unit may turn on all switches of the first switching unit.

That is, when receiving the motor stop command and heater operation command through an external device such as an external operating device, the control unit sets the power control output value Vpc_out, then turns on a first heater switch Sh1, a second heater switch Sh2, and a third heater switch Sh3 formed in the third switching unit to connect the heating unit and the third switching unit to each other, and when the PWM duty Vhpwm of the third switching unit is equal to the set power control output value Vpc_out, the control unit turns on the first common switch Sp1, the second common switch Sp2 and the third common switch Sp3 formed in the first switching unit to connect the first switching unit, the heating element, and the third switching unit to each other and operate the heater. When receiving the heater stop command, the control unit turns off the switches of the first switching unit and the switches of the third switching unit to stop the operation of the heater.

Figure 4:
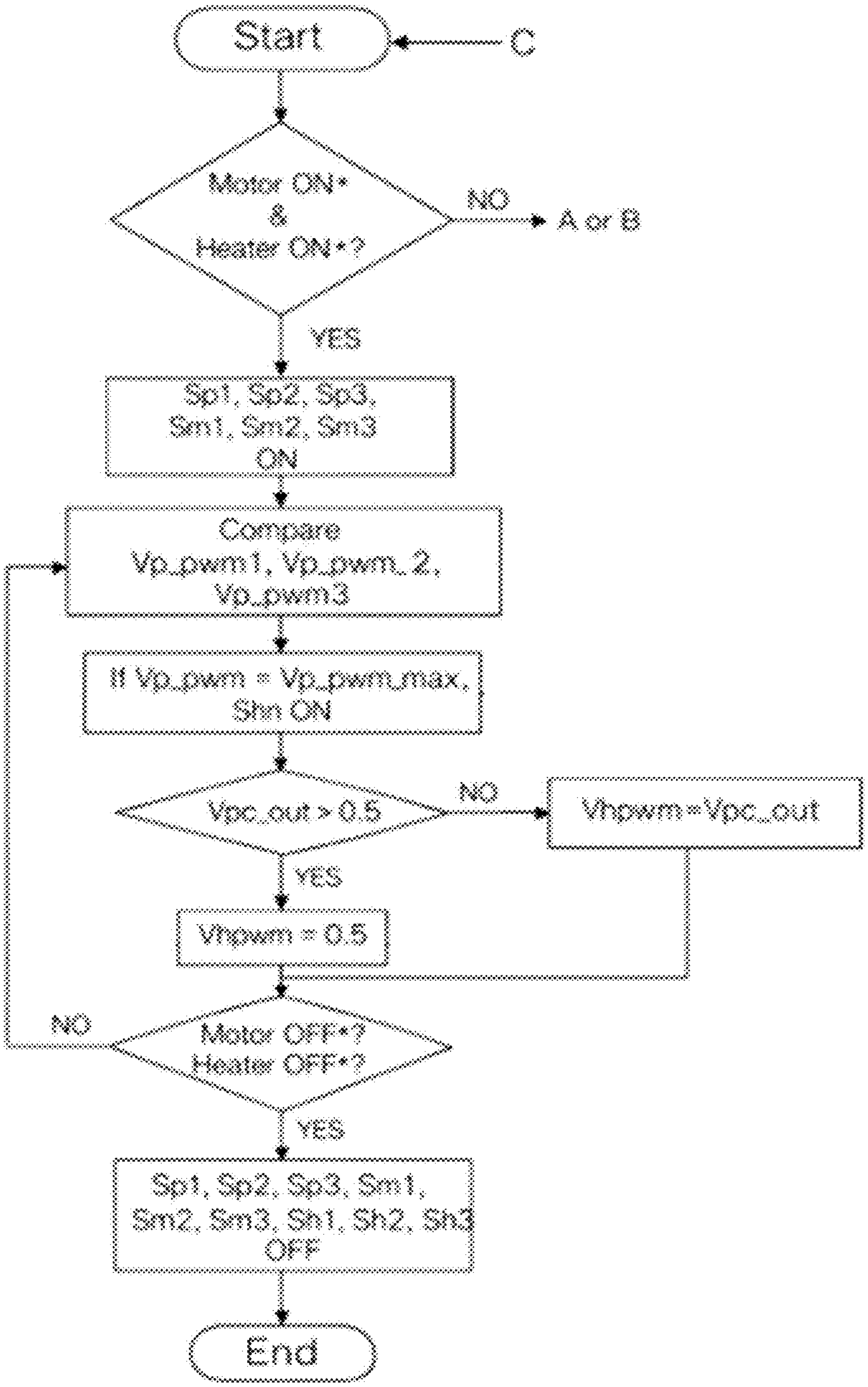
FIG. 4 is a flowchart illustrating a motor and heater operation control according to the present invention.

Referring to FIG. 4, when receiving the motor operation command and heater operation command, the control unit turns on all switches of the first switching unit and all switches of the second switching unit, compares PWM duties applied to each switch of the first switching unit, and turns on a switch Shn of the third switching unit connected to a switch in which the largest PWM duty is applied.

When receiving the motor operation command and heater operation command through an external device such as an external control unit, the control unit turns on the first common switch Sp1, the second common switch Sp2 and the third common switch Sp3 formed in the first switching unit and the first motor switch Sm1, the second motor switch Sm2 and the third motor switch Sm3 formed in the second switching unit, and connects the first switching unit, the motor, and the second switching unit to each other to operate the motor. The control unit selects a switch of the first switching unit having the largest PWM duty Vp_pwm_max by comparing a first common PWM Vp_pwm1, a second common PWM Vp_pwm2, and a third common PWM Vp_pwm3, which are PWM duties of each switch formed in the first switching unit. Then, in order to heat a heating element connected to the switch of the first switching unit having the largest PWM duty Vp_pwm_max, the control unit turns on a corresponding switch Shn of the third switching unit connected to the corresponding heating element to operate the heater. In this case, since the switch of the first switching unit having the largest PWM duty Vp_pwm_max is periodically changed, the switch Shn of the third switching unit is also periodically changed.

Thereafter, when receiving the motor stop command and heater stop command, the control unit turns off the first heater switch Sh1, second heater switch Sh2, and third heater switch Sh3 formed in the third switching unit as well as the first common switch Sp1, second common switch Sp2 and third common switch Sp3 formed in the first switching unit, and the first motor switch Sm1, second motor switch Sm2 and third motor switch Sm3 formed in the second switching unit to stop the operation of the motor and the heater.

In addition, when the power control output value exceeds a reference duty value, the control unit may perform a control by applying the reference duty value to the PWM duty of the third switching unit. When the power control output value does not exceed the reference duty value, the control unit may perform to control a power of the heater by applying the power control output value to the PWM duty of the third switching unit.

That is, the control unit may turn ON/OFF the third switching unit with a duty limit to perform to control the power of the heater.

In this case, the reference duty value may be 0.5. That is, the control unit controls the power of the heater by setting the reference duty value as 0.5. The reason for setting the reference duty value as 0.5 is to perform to control a maximum power of the heater since the PWM duty is continuously variable, increases/decreases on the basis of 0.5, and thus must have a value greater than 0.5 among the 3-phase PWM duty in case of the SVPWM method.

Although not illustrated, the motor may be applied to any one of a cooling fan, a compressor, or a blower. That is, a motor equipped on the cooling fan, compressor, or blower may be applied as the motor as described above, and controlled by the above-described control unit. The present invention is not limited to the above embodiments, and the scope of application is diverse. Of course, various modifications and implementations are possible without departing from the subject matter of the present invention claimed in the claims.

DESCRIPTION OF REFERENCE NUMERALS

P: Power
100: First switching unit
200: Second switching unit
300: Motor
400: Heating unit
500: Third switching unit

What is claimed is:

1. A control system for a complex motor and heater driving circuit comprising:
- a complex motor and a heater driving circuit including a first switching unit connected to one end of each of a motor and a heating unit and configured to transmit power to the motor and the heating unit, a second switching unit connected to the other end of the motor to determine driving, and a third switching unit connected to the other end of the heating unit to determine driving; and
- a control unit connected to the complex motor and heater driving circuit and configured to control the complex motor and heater driving circuit,
- wherein when receiving a motor operation command, the control unit turns on all switches of the first switching unit and all switches of the second switching unit, and controls the first switching unit and the second switching unit using a Space Vector Pulse Width Modulation (SVPWM) method.

2. The control system of claim 1, wherein the motor is applied to any one of a cooling fan, a compressor, and a blower.

3. A control system for a complex motor and heater driving circuit comprising:

a complex motor and a heater driving circuit including a first switching unit connected to one end of each of a motor and a heating unit and configured to transmit power to the motor and the heating unit, a second switching unit connected to the other end of the motor to determine driving, and a third switching unit connected to the other end of the heating unit to determine driving; and a control unit connected to the complex motor and heater driving circuit and configured to control the complex motor and heater driving circuit, wherein when receiving a heater operation command, the control unit turns on all switches of the third switching unit after setting a power control output value, and turns on all switches of the first switching unit when a Pulse Width Modulation (PWM) duty of the third switching unit is equal to the power control output value.

4. The control system of claim 3, wherein the motor is applied to any one of a cooling fan, a compressor, and a blower.

5. A control system for a complex motor and heater driving circuit comprising:

a complex motor and a heater driving circuit including a first switching unit connected to one end of each of a motor and a heating unit and configured to transmit power to the motor and the heating unit, a second switching unit connected to the other end of the motor to determine driving, and a third switching unit connected to the other end of the heating unit to determine driving; and a control unit connected to the complex motor and heater driving circuit and configured to control the complex motor and heater driving circuit, wherein when receiving the motor operation command and the heater operation command, the control unit turns on all switches of the first switching unit and all switches of the second switching unit, and compares the PWM duty applied to each switch of the first switching unit, and turns on a switch of the third switching unit connected to a switch in which the largest PWM duty is applied.

6. The control system of claim 5, wherein when the power control output value exceeds a reference duty value, the control unit performs a control by applying the reference duty value to the PWM duty of the third switching unit.

7. The control system of claim 6, wherein the reference duty value is 0.5.

8. The control system of claim 5, wherein the motor is applied to any one of a cooling fan, a compressor, and a blower.

* * * * *